US007900027B2

(12) United States Patent
Hall et al.

(10) Patent No.: US 7,900,027 B2
(45) Date of Patent: Mar. 1, 2011

(54) SCALABLE LINK STACK CONTROL METHOD WITH FULL SUPPORT FOR SPECULATIVE OPERATIONS

(75) Inventors: Ronald P. Hall, Cedar Park, TX (US); Michael Lance Karm, Cedar Park, TX (US); David Mui, Round Rock, TX (US); Albert James Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/023,913

(22) Filed: Jan. 31, 2008

(65) Prior Publication Data

US 2009/0198959 A1 Aug. 6, 2009

(51) Int. Cl.
*G06F 9/40* (2006.01)
*G06F 9/312* (2006.01)

(52) U.S. Cl. ...................................... 712/242; 712/202

(58) Field of Classification Search ................. 712/202, 712/242

See application file for complete search history.

(56) References Cited

U.S. PATENT DOCUMENTS 4,296,470 A 10/1981 Fairchild et al.
5,964,868 A * 10/1999 Gochman et al. ........... 712/234
6,003,126 A 12/1999 Huynh et al.
6,009,509 A 12/1999 Leung et al.
6,467,007 B1 10/2002 Armstrong et al.
6,633,974 B1 10/2003 Sinharoy
6,848,044 B2 1/2005 Eisen et al.
7,136,990 B2 * 11/2006 Hooker ....................... 712/202
2005/0108505 A1 * 5/2005 Boutaud ..................... 712/205

* cited by examiner

*Primary Examiner*—Daniel Pan
(74) *Attorney, Agent, or Firm*—Yee & Associates, P.C.; Matthew B. Talpis

(57) ABSTRACT

A computer implemented method, a processor chip, a computer program product, and a data processing system managing a link stack. The data processing system utilizes speculative pushes onto and pops from the link stack. The link stack comprises a set of entries, and each entry comprises a set of state bits. A speculative push of a first instruction is received onto the data stack, and the first instruction is stored into a first entry of the set of entries. A first bit is set to indicate that the first instruction is a valid instruction. A second bit is set to indicate that the first instruction has been speculatively pushed onto the link stack. The link stack pointer control is updated to indicate that the first entry is a top-of-data stack entry.

15 Claims, 13 Drawing Sheets

START

RECEIVE A DETERMINATION FROM A BRANCH EXECUTION THAT A BRANCH-AND-LINK "SPECULATIVE PUSH" IS CORRECTLY PREDICTED — 1210

LOCATE THE CORRESPONDING ENTRY IN A LINK STACK — 1220

SET THE STATE BITS FOR THE CORRESPONDING ENTRY TO INDICATE THAT THE CORRESPONDING ENTRY IS NO LONGER A VALID ENTRY, AND THAT ANY "SPECULATIVE PUSH" HAS BEEN RESOLVED, AND THAT ANY "SPECULATIVE POP" HAS BEEN RESOLVED — 1230

END

260
BRANCH RESOLVE TAG/ADDRESS
270
FLUSH TAG/ADDRESS
LINK STACK
"POP" DATA
LINK STACK REG FILE
212
214
216
218
220
222
224
226
228
A
B
C
D
E
F
G
H
232
234
236
238
240
242
244
246
"POP" ADDRESS
LINK STACK CONTROL
LINK STACK POINTER CONTROL
230

SCALABLE LINK STACK CONTROL METHOD WITH FULL SUPPORT FOR SPECULATIVE OPERATIONS

BACKGROUND OF THE INVENTION

1. Field of the Invention

The present invention relates generally to data processing systems, processors, and computer implemented methods. More specifically, the present invention relates to data processing systems, processors, and computer implemented methods for maintaining the integrity of a link stack in response to a misprediction or flush.

2. Description of the Related Art

Modern high frequency microprocessors are typically deeply pipelined devices. For efficient instruction execution in such processors, instructions are often fetched and executed speculatively. An instruction may be fetched many cycles before it is executed. Since branch instructions may cause instruction fetching to start from a non-sequential location, the direction and target of a branch instruction is predicted when the branch is fetched so that instruction fetching can proceed from the most likely address. The prediction is compared with the actual direction and target of the branch instruction when the instruction is executed. If it is determined that the target or direction of the branch has been mispredicted, then the branch instruction is completed and all instructions fetched after the branch are flushed out of the instruction pipeline. New instructions are then fetched either from the sequential path of the branch if the branch is resolved as not taken, or from the target path of the branch if the branch is resolved as taken.

Often there are a number of branches, i.e., subroutine calls and returns, between the instructions that are being fetched and the instructions that are being executed in the processor execution units. Therefore, to handle subroutine calls and returns efficiently, many high frequency microprocessors employ a link stack. On a subroutine call, the address of the following instruction is "pushed" into the stack. On a subroutine return, the contents at the top of the stack, which are expected to contain the address of the instruction following the original subroutine call, are "popped" from the stack. Since "pushing" and "popping" from a hardware stack can normally be done when the branch is fetched, which is several cycles before the corresponding branches are executed in a deeply pipelined processor, such a linked stack mechanism helps implement the instruction fetching scheme across subroutine calls and returns to a great extent. Notwithstanding, the link stack can become corrupted during the process of speculative instruction fetching and execution.

A link stack ideally enables the fetch logic to determine the target of a branch-to-link "bclr" instruction without the typical latency required to process the previous branch-and-link "bl" instruction, to update to the architected link register, and retrieve the most current value. A branch-and-link instruction is used in a subroutine call where the processor branches to instructions in the subroutine and the return address is the next instruction after the subroutine call. The return address is stored in or "pushed onto" a link stack. When the processor gets to the end of the subroutine, a branch-to-link instruction branches back to the previously stored return address in the link stack. In this case, the return address is retrieved from or "popped from" the link stack.

A link stack exploits the common programming paradigm that branch-to-link operations generally will branch to the address saved by the most recent branch-and-link instruction. Although this link stack is not required for correct machine operation, it serves as a fetch accelerator by buffering a last-in/first-out (LIFO) stack history of the most recent branch-and-link return addresses and making the most recently added value available to the Instruction Fetch Address Register (IFAR) many cycles before it is available thorough normal link register write and read mechanisms. The link stack therefore provides a speculative address for the IFAR to enable lower latency fetches down the expected path of execution.

Accurate maintenance of the link stack proves to be complex as the rate of instruction fetch increases. With aggressive speculation, the link stack is required to accept "speculative pushes," wherein each branch-and-link is interpreted as a link stack "push" operation, and "speculative pops," wherein branch-to-link instructions function as a link stack "pop." Branch prediction provides a guess as to the direction of each branch, i.e., whether a branch was "taken" or "not taken." Until the actual direction of a conditional branch is resolved, the branch, successive instructions, and the link stack operation are considered speculative. If no branches are mispredicted, this speculation has no adverse effect on the state of the link stack. However, when a branch is determined to be mispredicted, the incorrect state of the machine must be eliminated, including the entries speculatively added to or removed from the link stack.

The link stack is also susceptible to corruption by flushes from other units, unrelated to branch misprediction. As the processor speculatively executes, several correctly predicted branches could be in flight when a flush occurs that requires the fetch logic to back up and re-execute instructions. This requires the link stack to be restored to its state at the time of the original fetch to that instruction.

Traditional approaches to link stack management are insufficient for superscalar processors that employ aggressive fetch and branch speculation. A simple stack mechanism maintains a top-of-stack pointer which is used to read on pop operations of the top-of-stack pointer followed by a decrement, and to write on push operations of the top-of-stack pointer preceded by an increment. In a traditional stack, consider the following sequence:

1) Push A;
2) Pop;
3) Push B.

The traditional stack is quickly corrupted where all three operations are speculative when initiated, and operation 2, a "pop" of instruction A, is later determined to be a misdirected branch whose results must be erased. The simple stack would have removed instruction A as a result of operation 2. Operation 3 would overwrite the instruction A entry, thus destroying the state prior to operation 2, which makes recovery impossible.

Previous approaches describe methods of utilizing the use of physical registers as temporary space for general registers. This is a useful technique for a link register stack, but has no underlying control mechanism to manage the speculation and recovery required for link stack operations.

SUMMARY OF THE INVENTION

The illustrative embodiments described herein provide a computer implemented method, a processor chip, a computer program product, and a data processing system for managing a link stack. The data processing system utilizes speculative pushes onto and pops from the link stack. The link stack comprises a set of entries, and each entry comprises a set of state bits. A speculative push of a first instruction is received onto the data stack, and the first instruction is stored into a first entry of the set of entries. A first bit is set to indicate that the first instruction is a valid instruction. A second bit is set to indicate that the first instruction has been speculatively pushed onto the link stack. The link stack pointer control is updated to indicate that the first entry is a top-of-data stack entry.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
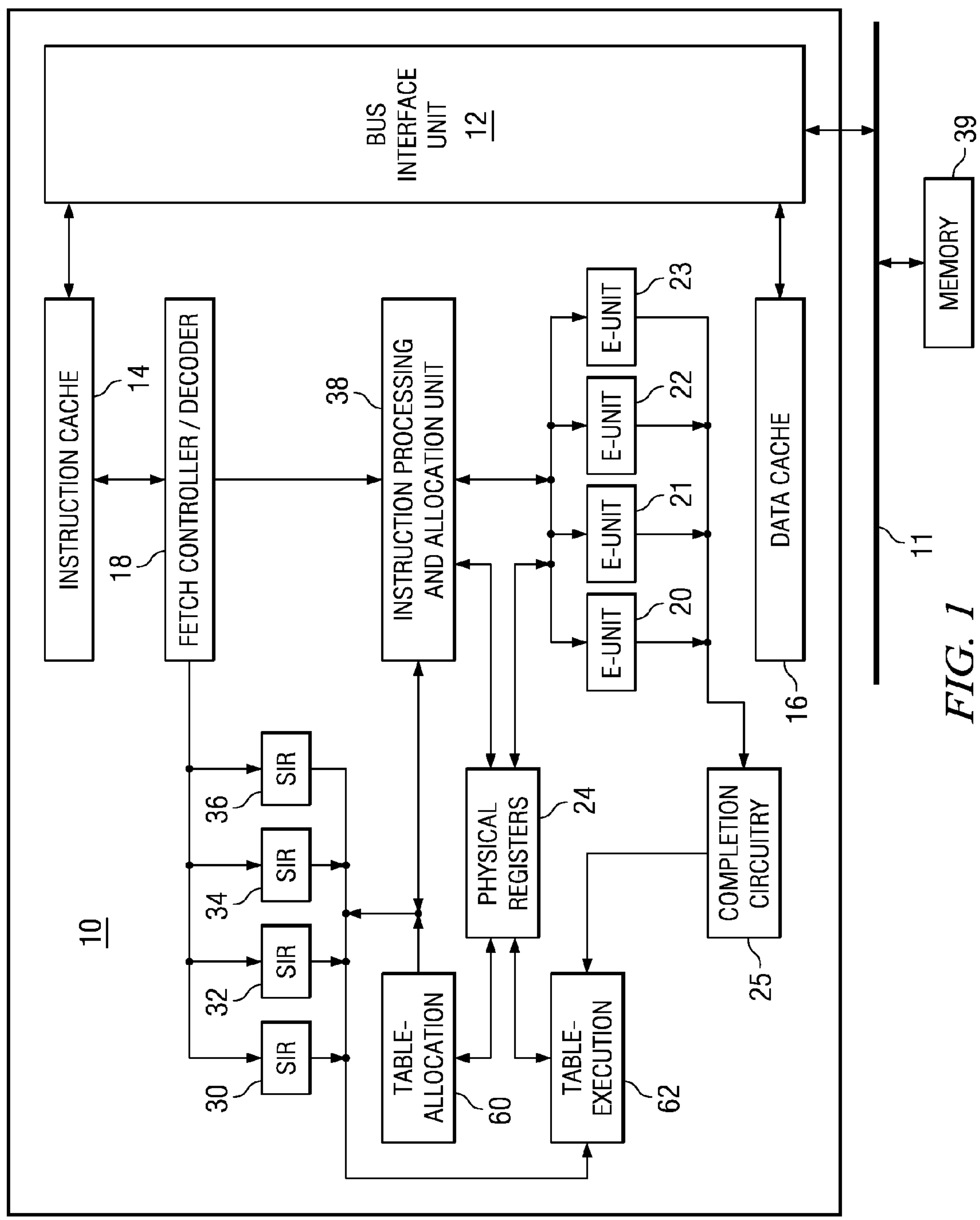
FIG. 1 is a high level block diagram of a superscalar data processing system which may be utilized to implement an illustrative embodiment.

Referring now to the figures, and specifically to FIG. 1, a high level block diagram of a superscalar data processing system which may be utilized to implement an illustrative embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit 12 of processor 10. Bus interface unit 12 controls the transfer of information between processor 10 and system bus 11.

Bus interface unit 12 is connected to an instruction cache 14 and to a data cache 16 of processor 10. Instruction cache 14 outputs instructions to a fetch controller and decoder 18. In response to such instructions from instruction cache 14, fetch controller and decoder 18 selectively outputs instructions to other execution circuitry of processor 10.

In fetch controller and decoder 18, in the preferred embodiment, the execution circuitry of processor 10 includes multiple execution units, such as execution units 20, 21, 22, and 23. Execution units 20, 21, 22, and 23 input their source operand information from a plurality of physical registers 24. According to an important feature of the present invention, none of the physical registers 24 are initially designated as a stack register.

When processor 10 is initially powered up, physical registers 24 each have an associated address. Those skilled in the art will recognize that physical registers 24 may include any number of physical registers.

In response to a Load instruction, information is input from data cache 16 and eventually copied to a selected one of physical registers 24. If such information is not stored in data cache 16, then data cache 16 inputs (through bus interface unit 12 and system bus 11) such information from system memory 39 connected to system bus 11. Moreover, data cache 16 is able to output (through bus interface unit 12 and system bus 11) information from data cache 16 to system memory 39 connected to system bus 11. In response to a Store instruction, information is input from a selected one of physical registers 24 and copies such information to data cache 16, which interface with table allocation 60 and table execution 62.

Processor 10 achieves high performance by processing multiple instructions simultaneously at various ones of execution units 20, 21, 22, and 23. Accordingly, each instruction is processed as a sequence of stages, each being executable in parallel with stages of other instructions. Such a technique is called "pipelining". In a significant aspect of the illustrative embodiment, an instruction is normally processed in five or more stages, namely fetch, decode, dispatch, execute, and completion.

In the fetch stage, fetch controller and decoder 18 selectively inputs (from instructions cache 14) one or more instructions from one or more memory addresses and decodes up to four fetched instructions. These decoded instructions are stored in special instruction registers (SIR) 30, 32, 34, and 36.

In the dispatch stage, instruction processor and allocation unit 38 pre-processes and selectively dispatches up to four decoded instructions to selected ones of execution units 20, 21, 22, and 23. In the dispatch stage, operand information is supplied to the selected execution units for dispatched instructions. Processor 10 dispatches instructions in order of their programmed sequence.

In the execute stage, execution units 20, 21, 22, and 23 execute their dispatched instructions and output results (destination operand information) of their operations for storage at selected entries in physical registers 24. In this manner, processor 10 is able to execute instructions out-of-order relative to their programmed sequence.

In the completion stage, completion circuitry 25 is utilized so that the instructions are completed in their programmed order.

In the preferred embodiment, each instruction requires one machine cycle to complete each of the stages of instruction processing. Nevertheless, some instructions, such as complex fixed point instructions, may require more than one cycle. Accordingly, a variable delay may occur between a particular instruction's execution and completion stages in response to the variation in time required for completion of preceding instructions.

Superscalar data processing system 10 may concurrently process multiple instructions per clock cycle. For purposes of this specification, superscalar data processing system 10 may process up to four (4) instructions per clock cycle. Those skilled in the art will recognize that superscalar data processing system 10 may concurrently process any number of instructions per clock cycle.

In register-based computer systems such as described above, operations that utilize data stored within the registers typically complete faster than those operations which utilize data stored elsewhere within the system, such as in a cache or main memory. Therefore, to maximize the performance of software that is processed by these systems, data should be kept in the physical registers.

The illustrative embodiments described herein provide a computer implemented method, a processor chip, a computer program product, and a data processing system for managing a link stack. The data processing system utilizes speculative pushes onto and pops from the link stack. The link stack comprises a set of entries, and each entry comprises a set of state bits. A speculative push of a first instruction is received onto the data stack, and the first instruction is stored into a first entry of the set of entries. A first bit is set to indicate that the first instruction is a valid instruction. A second bit is set to indicate that the first instruction has been speculatively pushed onto the link stack. The link stack pointer control is updated to indicate that the first entry is a top-of-data stack entry.

Figure 2:
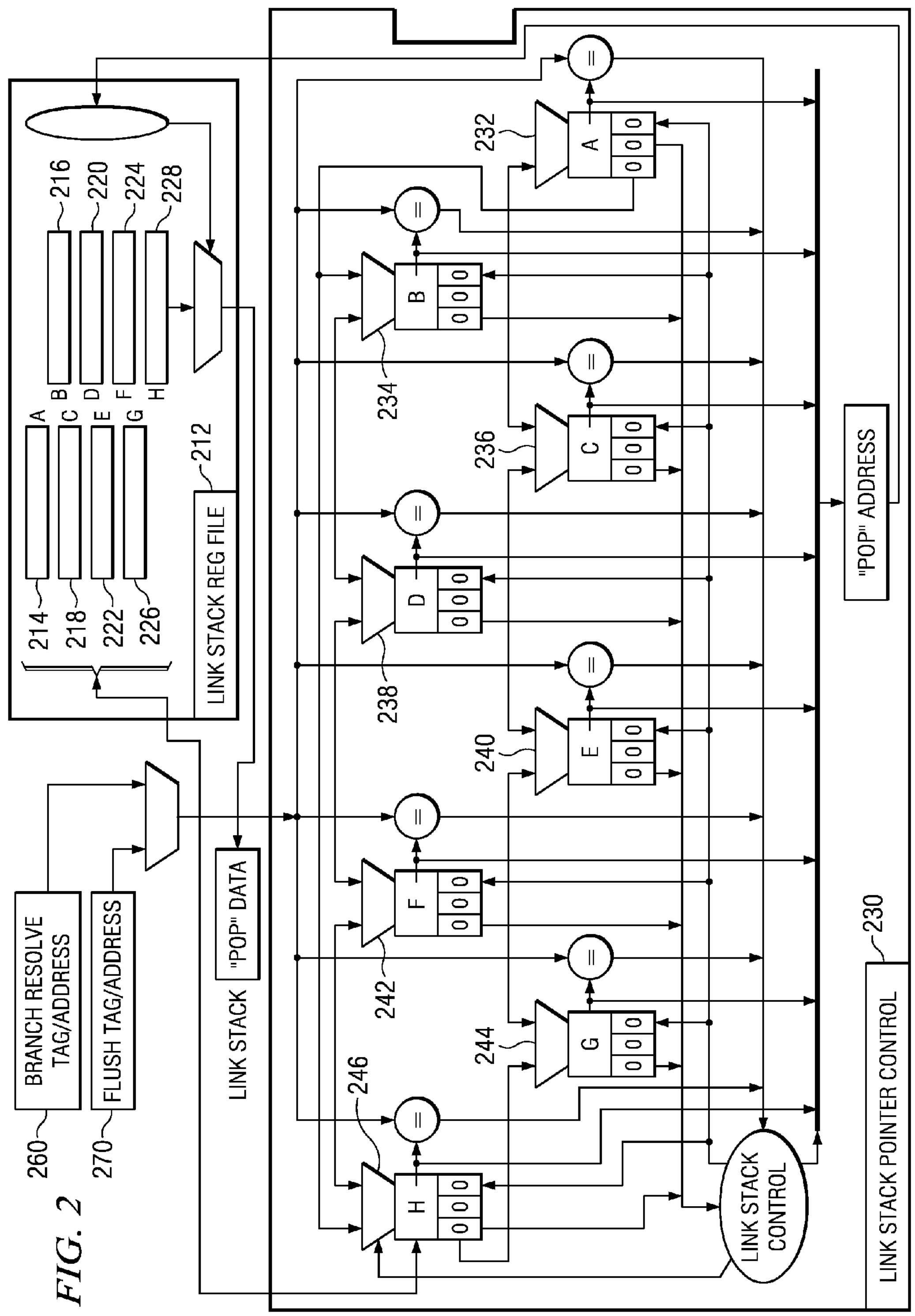
FIG. 2 is a link stack structure according to an illustrative embodiment.

Referring now to FIG. 2, a link stack structure is shown according to an illustrative embodiment. Link stack 200 is used to track and facilitate the operations of fetch controller and decoder 18 of FIG. 1.

Link stack register file 212 is a register file that contains memory location entries that have been allocated to the link stack register file. These entries include entry A 214, entry B 216, entry C 218, entry D 220, entry E 222, entry F 224, entry G 226, and entry H 228.

Link stack pointer control 230 is a control function for directing which entries of link stack register file 212 new addresses are written into and read from. Link stack pointer control 230 maintains a link stack index that includes a register file index for each link stack entry. The link stack index therefore includes register file index A 232, register file index B 234, register file index C 236, register file index D 238, register file index E 240, register file index F 242, register file index G 244, and register file index H 246. Each of register file index A 232 through register file index H 246 contains a reference pointer to a corresponding entry in the link stack register file. The link stack index maintains a relative order between each of the register file indexes. Branch resolve tag 260 and flush tag 270 are used to set or reset the state bits within the register file indexes.

Figure 3:
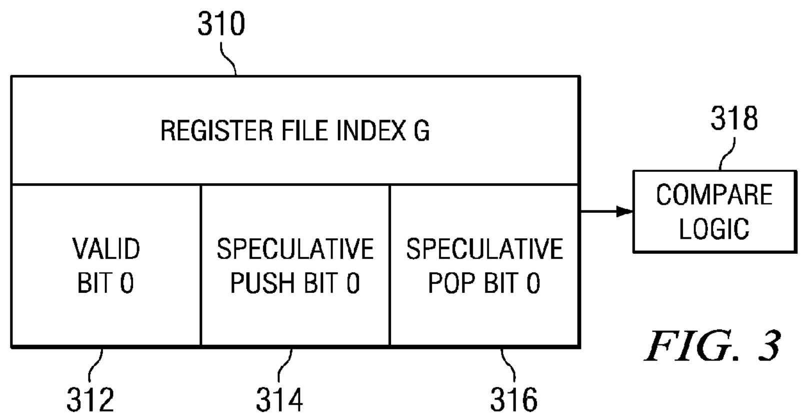
FIG. 3 is a singular register file index as contained in a link stack index according to an illustrative embodiment.

Referring now to FIG. 3, a singular register file index as contained in a link stack index is shown according to an illustrative embodiment. While FIG. 3 shows register file index 310 as register index file G 244 of FIG. 2, register file index 310 can be any of register file index A 232 through index H 246 of FIG. 2.

Register file index 310 contains 3 state bits: valid bit 312, speculative push bit 314, and speculative pop bit 316. Valid bit 312 is a bit indicating that an entry into a link stack, such as entry A 214 through entry H 228 of link stack register file 212 of FIG. 2, is valid. A branch tag, such as branch resolve tag 260 of FIG. 2, sets valid bit 312 when a link stack, such as link stack 200 of FIG. 2 receives a branch-and-link speculative "push." A Branch tag, such as branch resolve tag 260 clears valid bit 312 when a processor finally resolves the associated entry in the link stack register file containing a branch-and-link speculative "push" as mispredicted, or when a processor finally resolves the associated entry in the link stack register file containing a branch-to-link speculative "pop" as correctly predicted. Flush tag 270 of FIG. 2, clears valid bit 312 when register file index 310 is flushed, or a when a register index file "below" register file index 310 is flushed.

Speculative push bit 314 is a bit indicating that an entry into a link stack register file, such as entry A 214 through entry H 228 in link stack register file 212 of FIG. 2, is a branch-and-link speculative "push" instruction. A branch tag, such as branch resolve tag of FIG. 2, sets speculative push bit 314 when a link stack, such as link stack 200 receives a new branch-and-link speculative "push." The branch resolve tag clears speculative push bit 314 when a processor finally resolves an associated entry in the link stack register file containing a branch-and-link speculative "push" as either correctly predicted or mispredicted. The branch tag also clears speculative push bit 314 when a processor finally resolves an associated entry in the link stack register file containing a branch-to-link speculative "pop" as correctly predicted. A flush tag, such as flush tag 270 of FIG. 2, clears speculative push bit 314 when register file index 310 is flushed, or a when a register index file "below" register file index 310 is flushed.

Speculative pop bit 316 is a bit indicating that an entry into a link stack register file, such as entry A 214 through entry H 228 in link stack register file 212 of FIG. 2, has been used as a target prediction for a branch-to-link speculative "pop". A branch tag, such as branch resolve tag 260 of FIG. 2, sets speculative pop bit 316 when a new branch-to-link speculative "pop" accesses the link stack, such as link stack 200 of FIG. 2. The branch resolve tag clears speculative pop bit 316 when processor finally resolves an associated entry in the link stack register file containing a branch-to-link speculative "pop" as either correctly predicted or mispredicted. The branch tag also clears speculative pop bit 316 when a processor finally resolves an associated entry in the link stack register file containing a branch-and-link speculative "push" as mispredicted. A flush tag, such as flush tag 270 of FIG. 2, clears speculative pop bit 316 when register file index 310 is flushed, or a when a register index file "below" register file index 310 is flushed.

Compare logic 318 is associated with register file index 310. The link stack pointer control uses compare logic 318 to match register file index 310 from a branch resolution or a flush of mispredicted events. When compare logic 318 determines that register file index 310 matches a branch resolution or a flush of events, the branch tag or flush tag updates the state bits to invalidate an entry and clears the status bits of all entries to the left.

The operation of register file index 310 and the 3 state bits therein is summarized in Table 1 below:

TABLE 1

| Setting of State Bits within a Register index file | | | |
|---|---|---|---|
| Operation | valid bit 312 | Speculative push bit 314 | Speculative pop bit 316 |
| Branch-and-link speculative "push" | 1 | 1 | 0 |
| Branch-to-link speculative "pop" | 1 | X | 1 |
| speculative "push" is resolved as correctly predicted | 1 | 0 | X |
| speculative "push" is resolved as mispredicted | 0 | 0 | 0 |
| speculative "pop" is resolved as correctly predicted | 0 | 0 | 0 |
| speculative "pop" is resolved as mispredicted | 1 | X | 0 |
| "Flush" | 0 | 0 | 0 |

Referring now to FIG. 4, a branch-and-link speculative "push" of the link stack pointer control is shown according to an illustrative embodiment. The branch-and-link event of FIG. 4 occurs in a link stack pointer control, such as link stack pointer control 230 of FIG. 2, responsive to a branch-and-link "speculative push" event added to a link stack register file, such as link stack register file 212 of FIG. 2.

Link stack register file 412 is link stack register file 212 of FIG. 2. Prior to the "push" operation of FIG. 4, a processor has speculatively "pushed" address "XXYY" into entry A 414, and a processor has speculatively "pushed" address "WWZZ" into entry B 416.

Figure 4A:
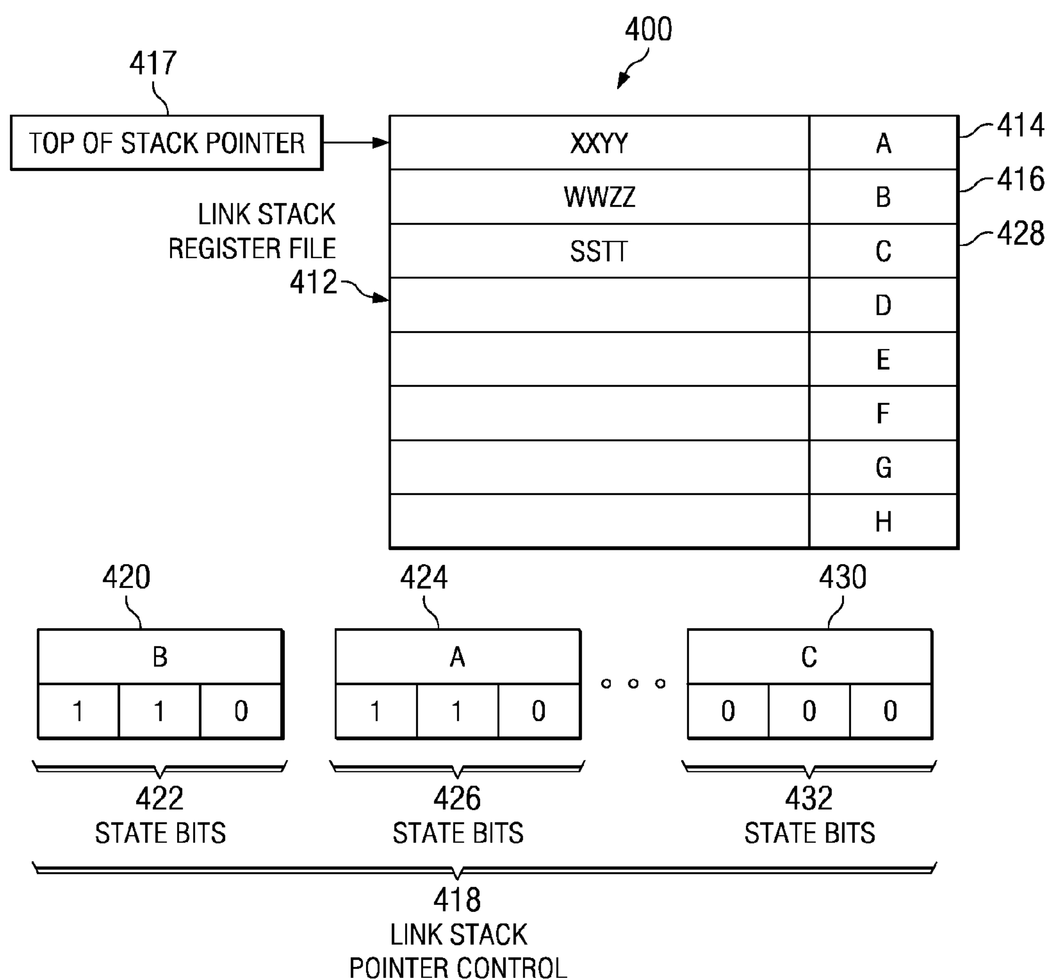
FIGS. 4*a-b* are a branch-and-link speculative "push" of the link stack pointer control according to an illustrative embodiment.

An initial state of link stack 400 is shown in FIG. 4*a*. Top-of-stack pointer 417, determined by the leftmost entry of the link stack control 418 with state bits "1 X 0", initially indicates entry B 416 as the top of link stack register file 412. Entry B 416 is indicated graphically within link stack pointer control 418 as the top of link stack register file 412 as register file index B 420, which is the leftmost entry of the link stack index. Register file index B 420 has state bits 422 of "1 1 0," indicating that the entry of "WWZZ" in entry B 416 is a valid, branch-and-link speculative "push."

In one illustrative embodiment, such as in an all hardware implementation, top-of-stack pointer 417 is a specified file index within the link stack. If, for example, the file indexes are arranged in a left-to-right orientation, top-of-stack pointer 417 would be the left-most valid index having a speculative pop bit, such as speculative pop bit 316 of FIG. 3, equal to 0.

Entry A 414 is indicated graphically within link stack pointer control 418 as a next entry below the top-of-stack entry B 416. Because link stack register file 412 is a "last-in, first-out" type structure, link stack register file 412 received entry A 414 prior to receiving entry B 416. The link stack index of link stack pointer control 418 graphically indicates entry A 414 as register file index A 424. The link stack index of link stack pointer control 418 graphically indicates register file index A 424 as the second entry in link stack register file 412 and as the second leftmost entry of the link stack index. Register file index A 424 has state bits 426 of "1 1 0," indicating that the entry of "XXYY" in entry A 414 is a valid, branch-and-link speculative "push."

The link stack index of link stack pointer control 418 graphically indicates entry C 428 as the bottom of link stack register file 412. The link stack index of link stack pointer control 418 graphically indicates entry C 428 as register file index C 430, which is the rightmost entry of the link stack index. The link stack index of link stack pointer control 418 can include other register file indexes, such as register file index D 238, register file index E 240, register file index F 242, register file index G 244, and register file index H 246 of FIG. 2, between register file index C 430 and register file index A 424, depending on the implemented size of link stack 400. Register file index C 430 initially has state bits 432 of "0 0 0," indicating an invalid, unpushed, unpoped entry. State bits of "0 0 0" are available to accept an incoming entry.

During a first clock cycle, a processor pushes new address "SSTT," which represents the return address of a branch-and-link instruction, onto link stack 400. The new "SSTT" instruction is stored at entry C 428. The specific memory locations of previously entered entries that have been allocated to the link stack register file do not change. With the push of address "SSTT" into entry C 428, the specific memory locations for address "XXYY" in entry A 414 and address "WWZZ" in entry B 416 are not altered.

Figure 4B:
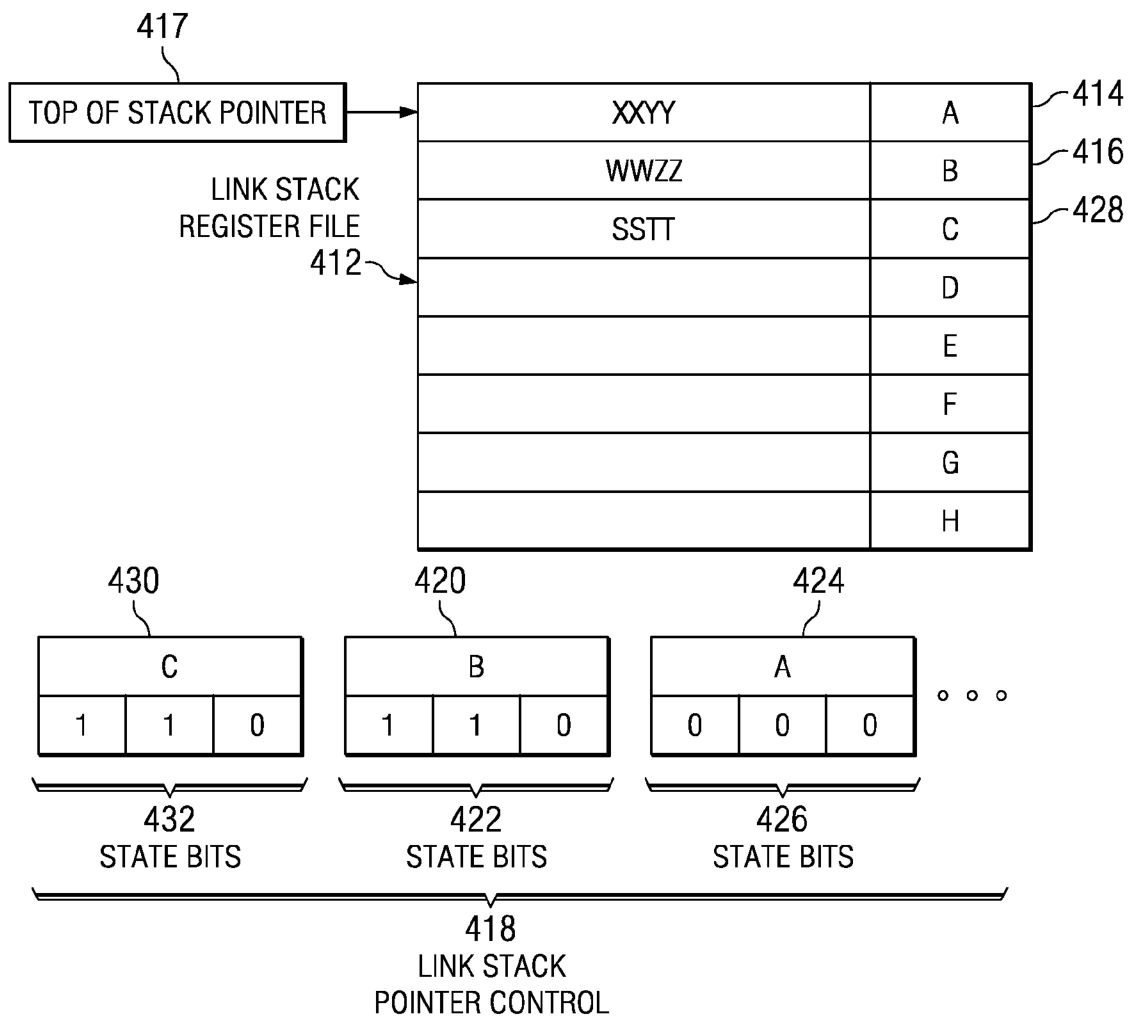

Referring now to FIG. 4*b*, in a subsequent clock cycle, link stack pointer control 418 performs a "right-shift" of link stack 400. Link stack pointer control 418 increments top-of-stack pointer 417 indicate entry C 428 as the top of link stack register file 412.

A "right-shift" is an operation of the link stack pointer control in response to branch-and-link speculative "push." The link stack pointer control increments top-of stack pointer to the new entry in the link stack. In one illustrative embodiment, such as in an all hardware implementation, the file indexes are arranged in a left-to-right orientation. File index C 430 is then rotated from the right-most position to the left most position in the link stack pointer control 418, as explained below. Since file index C 430 is now the left-most index with state "1×0", it is considered the current "top of stack", as graphically represented by 417 in FIG. 4*b*.

Within the link stack index of link stack pointer control 418, Link stack pointer control 418 shifts register file index A 424 and register file index B 420 "to the right." Link stack pointer control 418 relocates register file index C 430 is from the rightmost position within the link stack index of link stack pointer control 418 to the leftmost position, indicating that register file index C 430 is now the top of link stack register file 412. Link stack pointer control 418 accomplishes this by moving top-of stack pointer to identify entry C 428 in link stack 400.

Branch resolve tag 260 of FIG. 2, sets state bits 426 of register file index C 421. State bits 426 are now set to "1 1 0," indicating that address "XXYY" in entry A 414 is a valid, branch-and-link speculative "push."

In one illustrative embodiment, such as in an all hardware implementation, the file indexes are arranged in a left-to-right orientation. The leftmost position within link stack pointer control 418, the first entry with state bits "1×0" indicates the top of the link stack.

Referring now to FIG. 5, a branch-to-link speculative "pop" of the link stack pointer control is shown according to an illustrative embodiment. The branch-to-link event of FIG. 5 occurs in a link stack pointer control, such as link stack pointer control 230 of FIG. 2, responsive to a branch-to-link "speculative pop" event of an entry within a link stack register file, such as link stack register file 212 of FIG. 2.

Figure 5A:
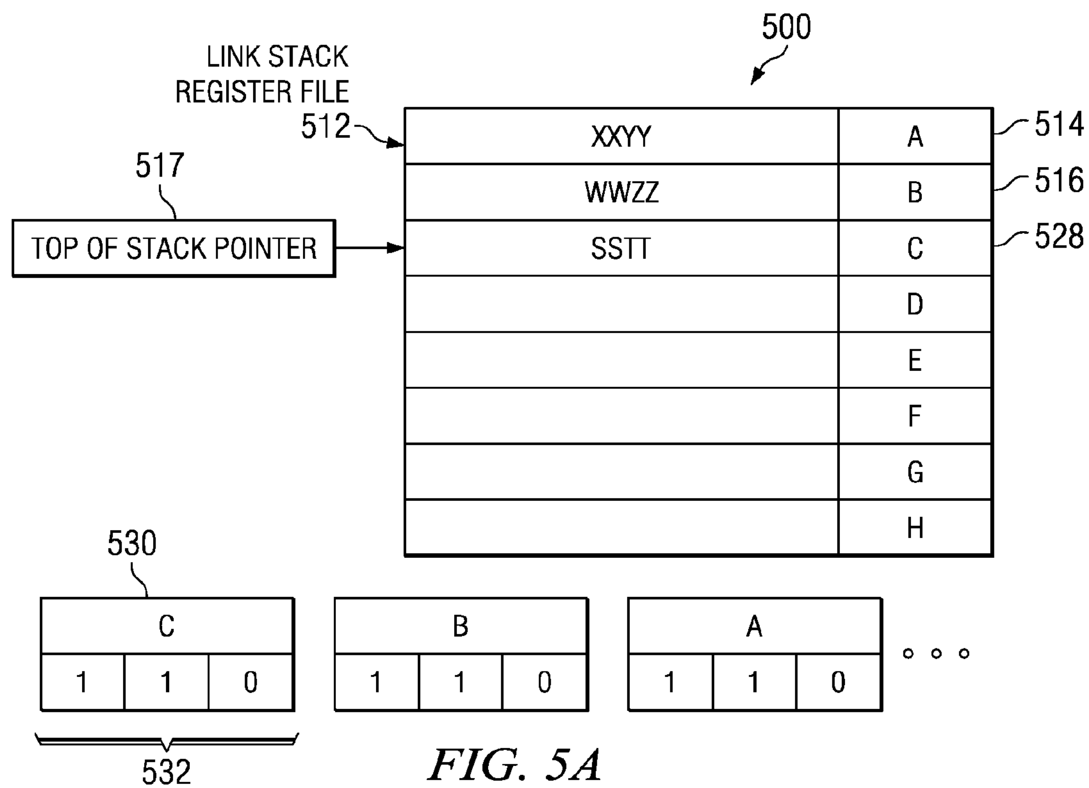
FIGS. 5*a-b* are a branch-to-link speculative "pop" of the link stack pointer control according to an illustrative embodiment.

FIG. 5*a* is the link stack of FIG. 4*b*. Top-of-stack pointer 517 indicates that entry C 528 containing address "SSTT" is the top of link stack register file 512. Address "WWZZ" at entry B 516 and address "XXYY" at entry A 514 have been previously pushed onto link stack 500.

A processor performs a branch-to-link "speculative pop" event on link stack 500. Because top-of-stack pointer 517 currently indicates entry C 528 as the top of link stack register file 512, the "pop" event occurs at entry C 528.

In one illustrative embodiment, such as in an all hardware implementation, the file indexes are arranged in a left-to-right orientation. Entry C 528 is the left-most control index with state bits "1×0." Being the left-most control index, entry C 528 is considered the top of stack index pointer and therefore handles the "pop" operation.

State bits 532 of register file index C 530, which correspond to entry C 528, are initially set to "1 1 0." The first bit, which is valid bit 312 of FIG. 3, indicates that entry C 528 is a valid entry. The second bit, which is speculative push bit 314 of FIG. 3, indicates that the push branch which created entry C 528 has not yet been resolved as correctly predicted or mispredicted, i.e., entry C 528 is still speculative.

Figure 5B:
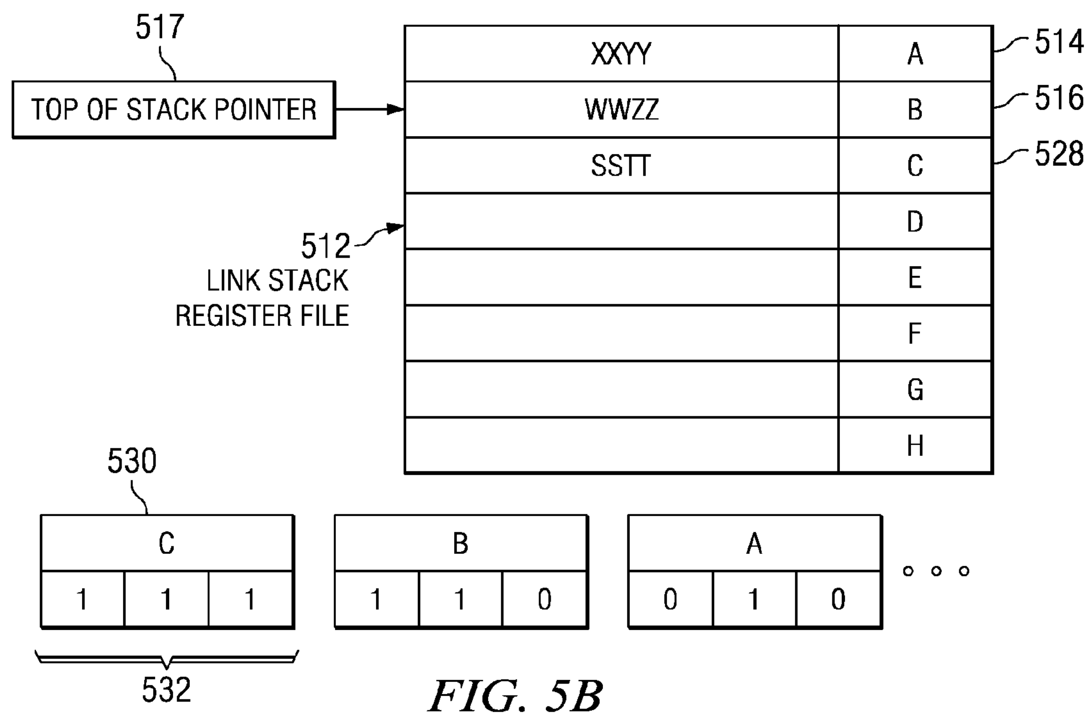

Referring now to FIG. 5*b*, state bits 532 of register file index C 530, which correspond to entry C 528, have been set to "1 1 1." The first and second bits still indicate that entry C 528 is a valid entry that has not yet been resolved as correctly predicted or mispredicted. Responsive to the branch-to-link "speculative pop," a branch tag, such as branch resolve tag 260 of FIG. 2, sets the third bit of state bits 532 to "1," indicating that a branch-to-link "speculative pop" event has been performed on entry C 528. In a subsequent clock cycle, link stack pointer control 517 shifts top-of-stack pointer 517 to point to entry B 516 as the top of link stack register file 512.

In one illustrative embodiment, such as in an all hardware implementation, the file indexes are arranged in a left-to-right orientation. Entry B 516 is considered the top-of-stack pointer since it is now the left-most index with state bits "1×0". This top-of-stack change is accomplished with no shifting.

Because the branch-to-link "speculative pop" event has not yet been resolved as either correctly predicted or mispredicted, entry C 528 retains address "SSTT." Subsequent speculative pushes are added to link stack 500 "on top" of entry C 528. Only when entry C 528 is resolved as either correctly predicted or mispredicted, will the link stack control structure allow address "SSTT" from entry C 528 to be overwritten with a new push operation.

Figure 6A:
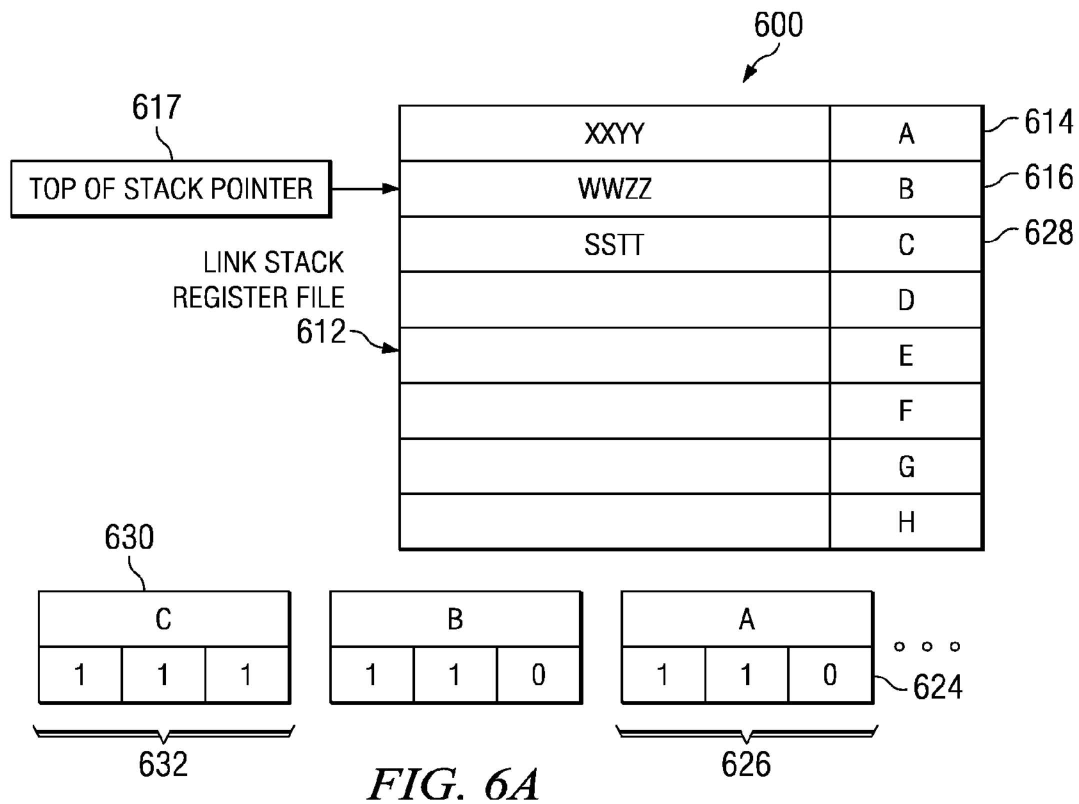
FIGS. 6*a-b* are a resolution of a correctly predicted branch-and-link speculative "push" of a link stack according to an illustrative embodiment.

Referring now to FIG. 6*a*, FIG. 6*a* is the link stack of FIG. 5*b*. Address "WWZZ" at entry B 616 and address "XXYY" at entry A 614 have been previously speculatively pushed onto link stack 600. Address "SSTT" at entry C 628 has been previously speculatively pushed onto, and speculatively popped from link stack 600. State bits 626 of register file index A 624 are set to "1 1 0," indicating that address "XXYY" in entry A 614 is a valid, branch-and-link speculative "push."

Figure 6B:
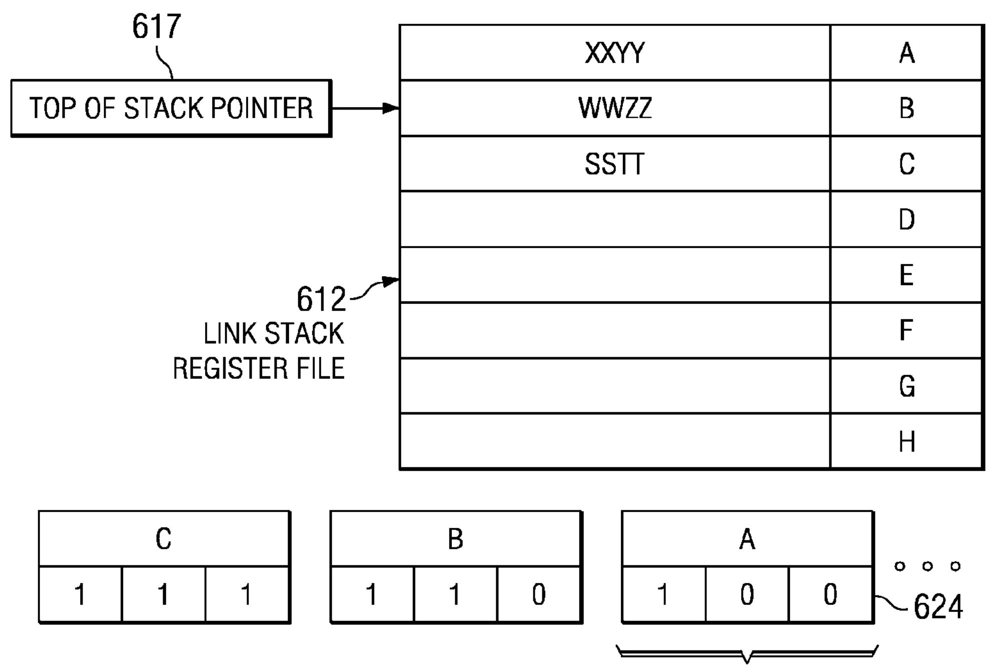

Referring now to FIG. 6*b*, entry A 614 is resolved as correctly predicted. Responsive to entry A 614 being correctly predicted, state bits 626 of register file index A 624 are set to "1 0 0." The first bit of state bits 626 is set to "1," indicating that entry A 614 is a valid entry. The second bit of state bits 626 is set to "0," indicating that that the branch-and-link speculative "push" of entry A 614 has been resolved as either correctly predicted or mispredicted—in this case, entry A 614 has been resolved as correctly predicted. The final bit "0" indicates that a branch-to-link "speculative pop" of entry A 614 has not occurred.

Because a branch-to-link "speculative pop" of entry A 614 has not yet occurred and been resolved, address "XXYY", entry A 614, indexed by 624 remains valid.

Figure 7A:
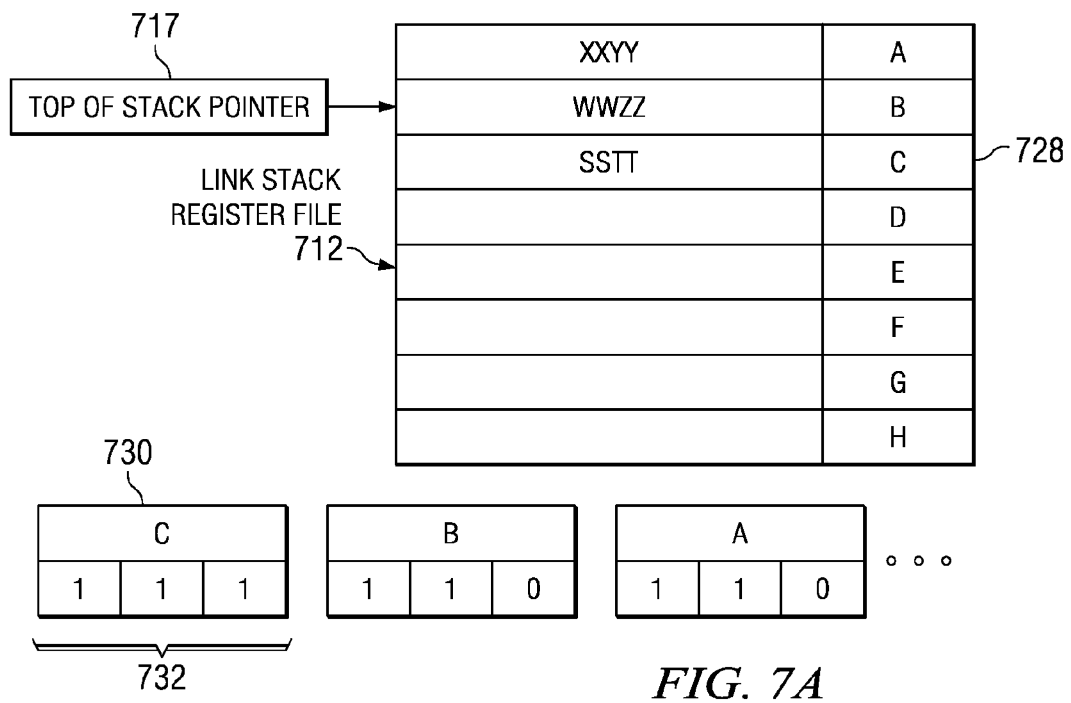
FIGS. 7*a-c* are a resolution of a correctly predicted branch-to-link speculative "pop" of a link stack according to an illustrative embodiment.

Referring now specifically to FIG. 7*a*, FIG. 7*a* is the link stack of FIG. 5*b*. State bits 732 of register file index C 730, which correspond to entry C 728, have been set to "1 1 1." The first and second bits still indicate that entry C 728 is a valid entry that has not yet been resolved as correctly predicted or mispredicted. The third bit of state bits 732 indicates that a branch-to-link "speculative pop" event has been performed on entry C 728, which has not yet been resolved.

Figure 7B:
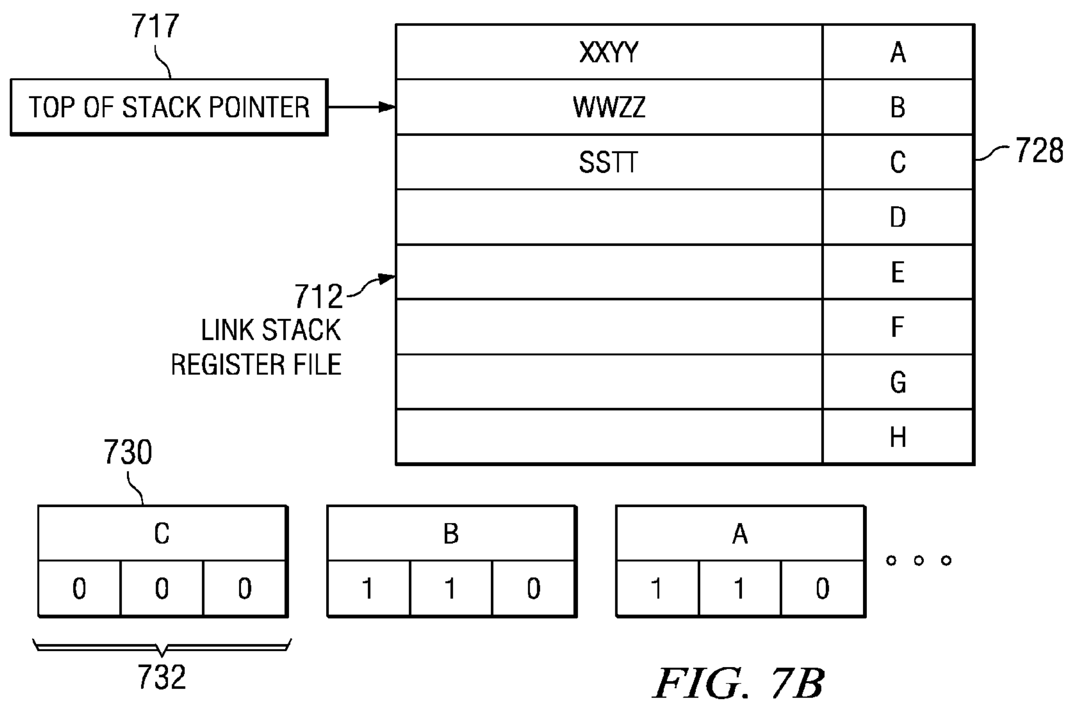

Referring now to FIG. 7*b*, branch-to-link speculative "pop" is resolved as correctly predicted. Responsive to the branch-to-link speculative "pop" of entry C 728 being correctly predicted, state bits 732 of register file index C 730 are set to "0 0 0," signifying that a pop of address "SSTT" from entry C 728 has occurred. Entry C 728 and register file index C 730 are now empty, and are available to receive a new address for a subsequent branch-and-link speculative "push."

Figure 7C:
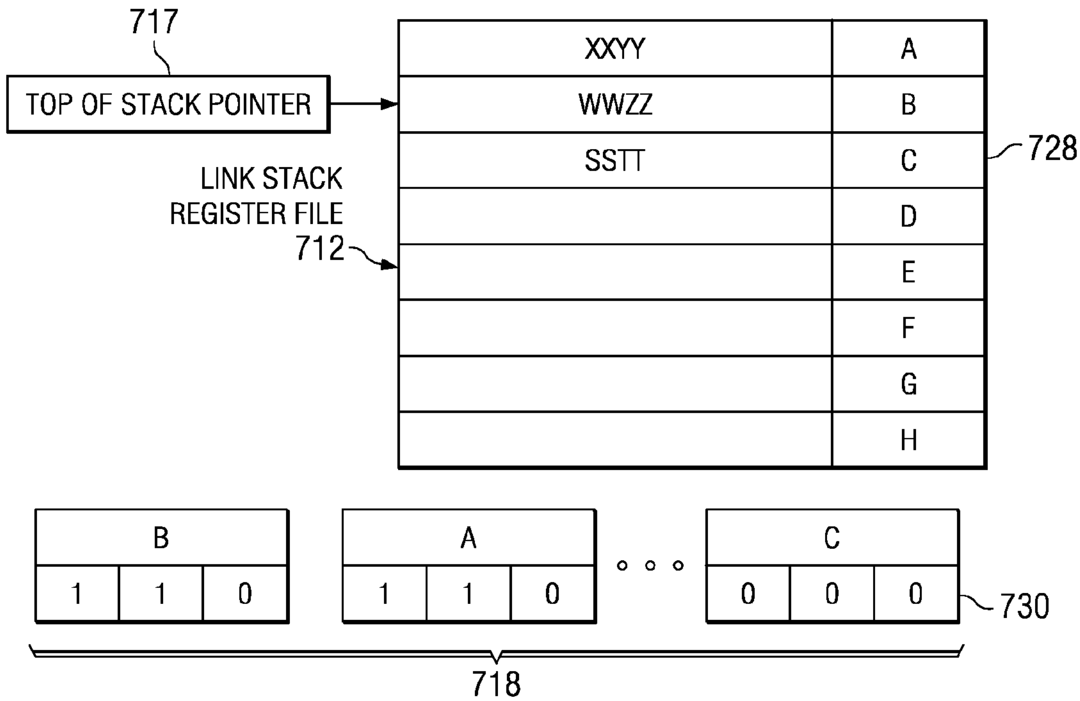

Referring now to FIG. 7*c*, a "left-shift" of link stack 700 occurs in response to the empty entry C 728. A "left-shift" is an operation in the link stack pointer control in response to the resolution of a branch-to-link speculative "pop." The register file index for the empty entry is relocated to the bottom of the link stack index of the link stack pointer control. Register file indexes for entries that were entered onto the link stack prior to the empty entry are "shifted-left" in the link stack index of the link stack pointer control.

Because entry C 728 was empty, link stack pointer control 718 relocates register file index C 730 to the rightmost location within the link stack index, such that entry C 728 is now at the "bottom" of link stack 700. Register file index C 730, and any other register index file in the link stack index of link stack pointer control 718, such as for example link stack index D 238-H link stack index 246 of FIG. 2 are "shifted-left" in the link stack index of the link stack pointer control 718.

Referring now to FIG. 8, a resolution of a mispredicted branch-and-link speculative "push" of a link stack is shown according to an illustrative embodiment. The resolution of the branch-and-link event of FIG. 8 occurs in a link stack, such as link stack 200 of FIG. 2, responsive to a branch-and-link "speculative push" being mispredicted.

Figure 8A:
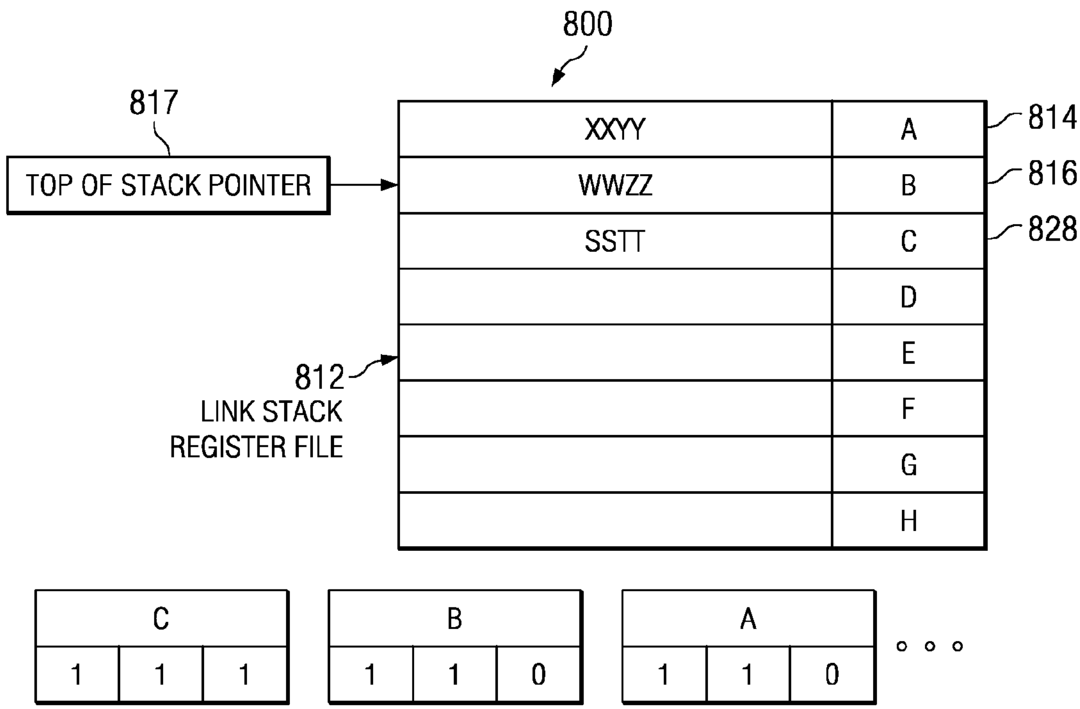
FIGS. 8*a-c*, are a resolution of a mispredicted branch-and-link speculative "push" of a link stack according to an illustrative embodiment.

FIG. 8*a* is the link stack of FIG. 5*b*. Top-of-stack pointer 817 indicates that entry B 816 is the top of link stack register file 812. Address "WWZZ" at entry B 816 and address "XXYY" at entry A 814 have been previously speculatively pushed onto link stack 800. Address "SSTT" at entry C 828 has been previously speculatively pushed onto, and speculatively popped from link stack 800.

Figure 8B:
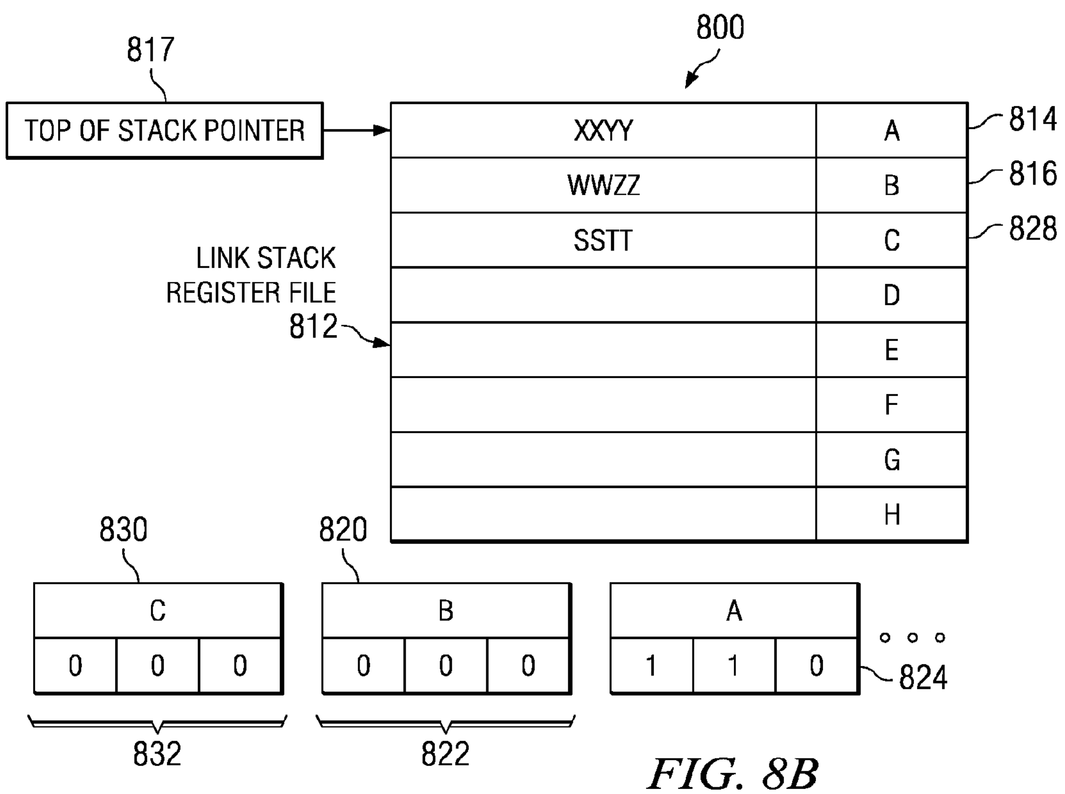

Referring now to FIG. 8*b*, a "flush" of entry B 816 and entry C 828 occurs in response to branch execution determining that the branch-and-link speculative "push" of address "WWZZ" at entry B 816 is mispredicted. Responsive to determining that the branch-and-link speculative "push" of address "WWZZ" at entry B 816 is mispredicted, state bits 822 of register file index B 820 are set to "0 0 0." Furthermore, state bits 832 of register file index C 830 are also set to "0 0 0." Entry B 816 and entry C 828 are now empty entries.

Figure 8C:
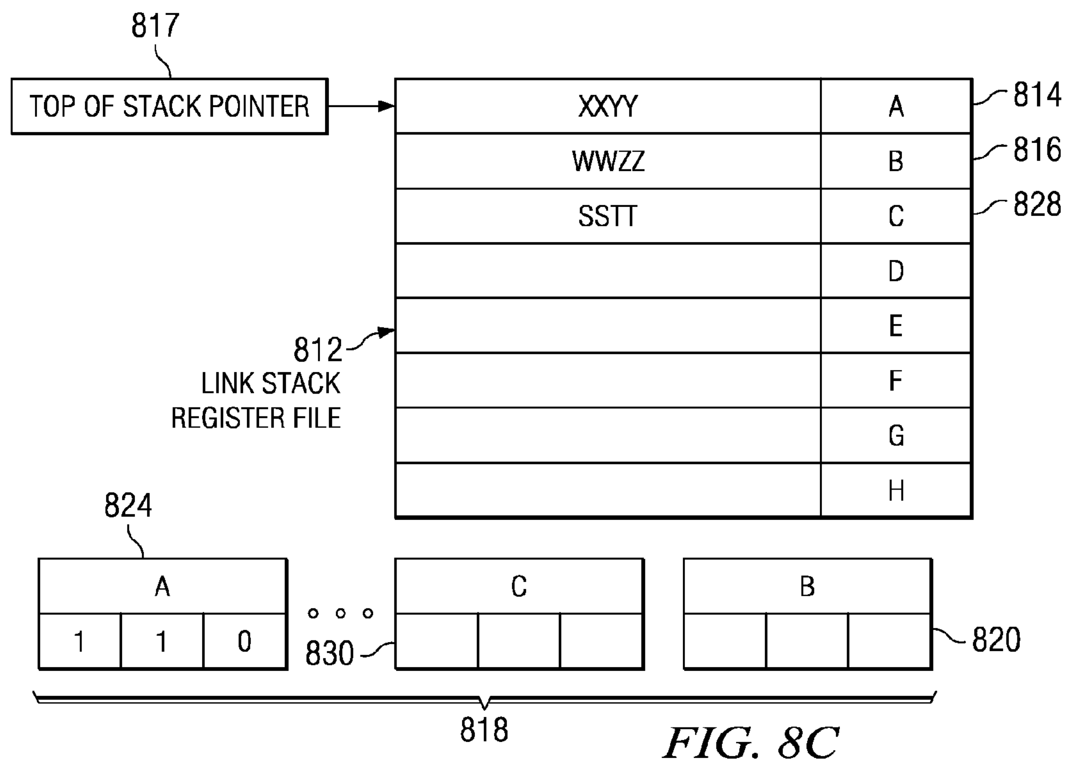

Referring now to FIG. 8*c*, a "left-shift" of link-stack 800 occurs in response to the empty entries at entry B 816 and entry C 828. Link stack pointer control 818 first relocates register file index C 830 to the rightmost location within the link stack index, such that entry C 828 is now at the "bottom" of link stack 800. Register file index B 820, register file index A 824, and any other register index file in the link stack index of link stack pointer control 818, such as for example link stack index D 238-H link stack index 246 of FIG. 2, are "shifted-left" in the link stack index of the link stack pointer control 818. Because entry B is also empty as a result of the "flush," a second "left-shift" of link-stack 800 occurs, such that entry B 816 is now at the "bottom" of link stack 800, and register file index A 824 is now the rightmost entry within the link stack index of link stack pointer control 818.

Referring now to FIG. 9, a resolution of a mispredicted branch-to-link speculative "pop" of a link stack is shown according to an illustrative embodiment. The resolution of the branch-to-link event of FIG. 9 occurs in a link stack, such as link stack 200 of FIG. 2, responsive to a branch-to-link "speculative pop" being mispredicted.

Figure 9A:
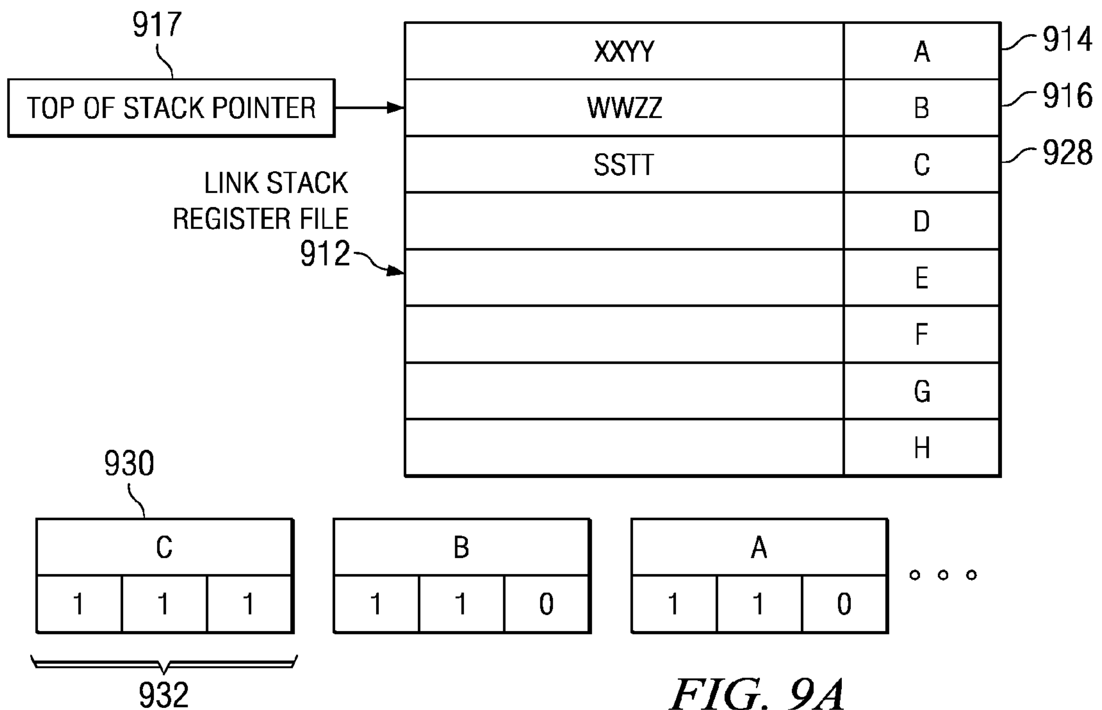
FIG. 9*a-b* are a resolution of a mispredicted branch-to-link speculative "pop" of a link stack according to an illustrative embodiment.

FIG. 9*a* is the link stack of FIG. 5*b* advanced by one cycle. Top-of-stack pointer 917 indicates that entry B 916 containing address "WWZZ" is the top of link stack register file 912. Address "WWZZ" at entry B 916 and address "XXYY" at entry A 914 have been previously pushed onto link stack 900.

State bits 932 of register file index C 930, which correspond to entry C 928, are initially set to "1 1 1." The first bit, which is valid bit 312 of FIG. 3, indicates that entry C 928 is a valid entry. The second bit, which is speculative push bit 314 of FIG. 3, indicates that entry C 928 has not yet been resolved as correctly predicted or mispredicted, i.e., entry C 928 is still speculative. The third bit, which is speculative pop bit 316 of FIG. 3, indicates the entry has been speculatively popped.

Figure 9B:
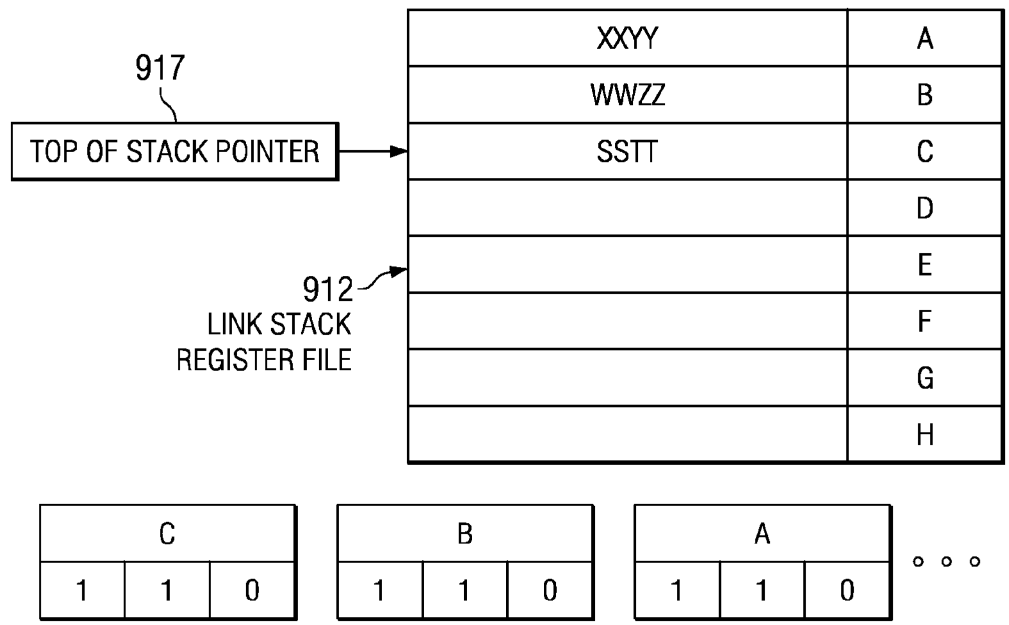

Referring now to FIG. 9*b*, branch execution determines that the "pop" of address "SSTT" at entry C 928 is mispredicted. Responsive to determining that the branch-and-link speculative "pop" of address "SSTT" at entry C 928 is mispredicted, state bits 932 of register file index C 930 are set to "1 X 0" where X is the current value of the speculative push bit. Link stack 900 therefore, retains address "SSTT" at entry C 928. However, because the speculative pop of address "SSTT" at entry C 928 was mispredicted, the speculative pop bit of state bits 932 is reset to "0," indicating that a speculative pop which has not yet been shown to be invalid of entry C 928 has not occurred. In the following cycle the top of stack pointer 917 will point to entry C 928.

Figure 10:
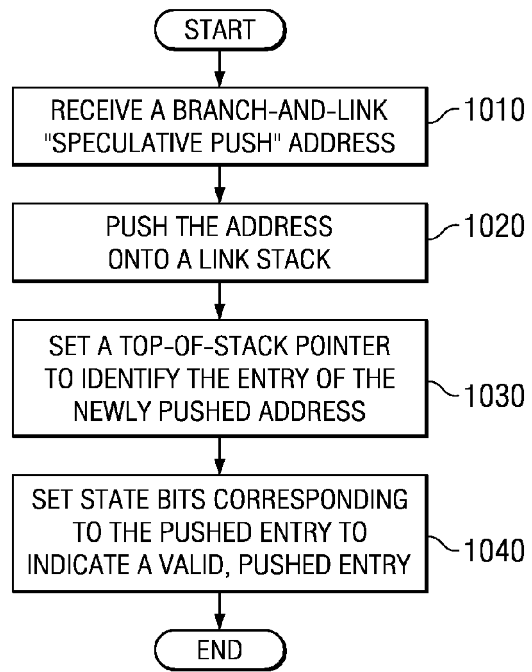
FIG. 10 is a flowchart for receiving a branch-and-link "speculative push" event according to an illustrative embodiment.

Referring now to FIG. 10, a flowchart for receiving a branch-and-link "speculative push" event is shown according to an illustrative embodiment. Process 1000 is a method of managing a link stack, such as link stack 200 of FIG. 2, within a superscalar processor making speculative predictions, such as processor 10 of FIG. 1.

Process 1000 begins by receiving a branch-and-link "speculative push" address (step 1010). Responsive to receiving a branch-and-link "speculative push" address, process 1000 "pushes" the address onto a link stack (step 1020). The address is "pushed" onto the stack by storing the "speculative push" address in a memory location entry of a link stack register file. These entries can be entry A 214 through entry H 228 of FIG. 2.

Responsive to pushing the branch-and-link "speculative push" address onto the link stack, process 1000 sets a top-of-stack pointer to identify the entry of the newly "pushed" address (step 1030). Further responsive to pushing the branch-and-link "speculative push" address onto the link stack, process 1000 sets state bits corresponding to the pushed entry to indicate a valid, "pushed" entry (step 1040), with the process terminating thereafter. In one illustrative example, state bits can be set to "1 1 0."

Figure 11:
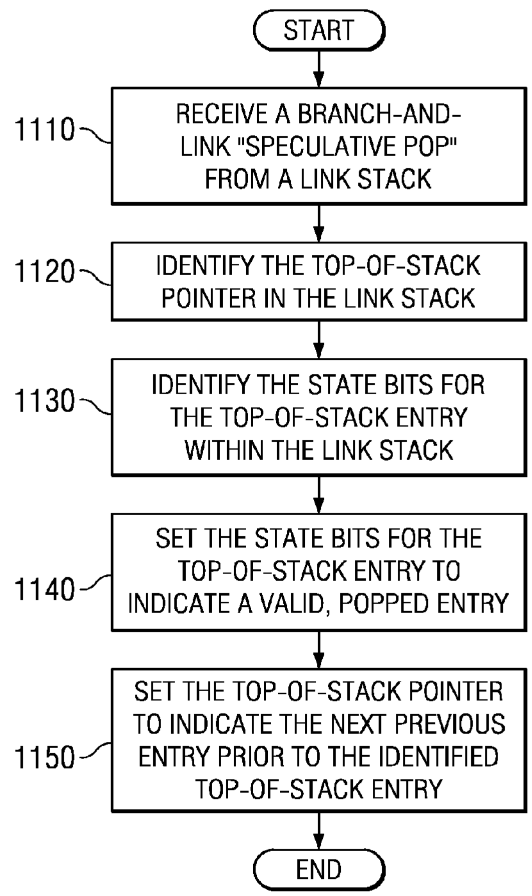
FIG. 11 is a flowchart for receiving a branch-to-link "speculative pop" event according to an illustrative embodiment.

Referring now to FIG. 11, a flowchart for receiving a branch-to-link "speculative pop" event is shown according to an illustrative embodiment. Process 1100 is a method of managing a link stack, such as link stack 200 of FIG. 2, within a superscalar processor making speculative predictions, such as processor 10 of FIG. 1.

Process 1100 begins by receiving a branch-to-link "speculative pop" from a link stack (step 1110). Responsive to receiving the branch-to-link "speculative pop," process 1110 identifies the top-of-stack pointer in the link stack (step 1120). Responsive to identifying the top-of-stack pointer in the link stack, process 1100 identifies the state bits for the top-of-stack entry within the link stack (step 1130).

Responsive to identifying the state bits for the top-of-stack entry within the link stack, process 1100 sets the state bits for the top-of-stack entry to indicate a valid, popped entry (step 1140). In one illustrative embodiment, the state bits of the top-of-stack entry can indicate a valid, popped entry by setting the state bits to "1 X1," where X is a current value of the pushed bit.

Further responsive to identifying the top-of-stack pointer in the link stack, process 1100 sets the top-of-stack pointer to indicate the next previous entry prior to the identified top-of-stack entry (step 1150), with the process terminating thereafter. The setting of the top of stack pointer to indicate the next previous entry designates that next previous entry as the new top-of-stack entry.

Figure 12:
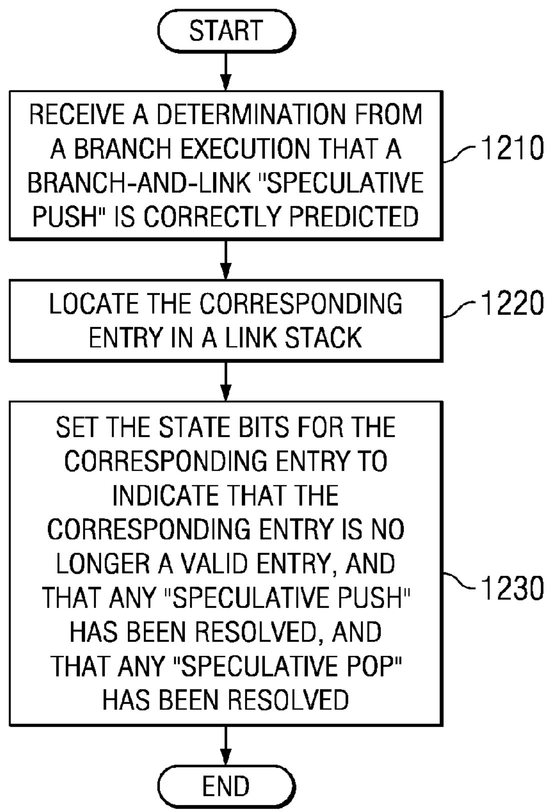
FIG. 12 is a flowchart showing the processing steps of a correctly predicted, branch-and-link "speculative push" according to an illustrative embodiment.

Referring now to FIG. 12, a flowchart showing the processing steps of a correctly predicted, branch-and-link "speculative push" is shown according to an illustrative embodiment. Process 1200 is a method of managing a link stack, such as link stack 200 of FIG. 2, within a superscalar processor making speculative predictions, such as processor 10 of FIG. 1.

Process 1200 begins by receiving a determination from a branch execution that a branch-and-link "speculative push" is correctly predicted (step 1210). Responsive to receiving the determination from a branch execution that the branch-and-link "speculative push" is correctly predicted, process 1200 locates the corresponding entry in a link stack (step 1220).

Process 1200 then sets the state bits for the corresponding entry to indicate a valid entry, and that the speculative push has been resolved (step 1230), with the process terminating thereafter. In one illustrative embodiment, the state bits for the corresponding entry indicating a valid entry and that the speculative push has been resolved are set to "1 0 X," where X is a current value of the popped bit.

Figure 13:
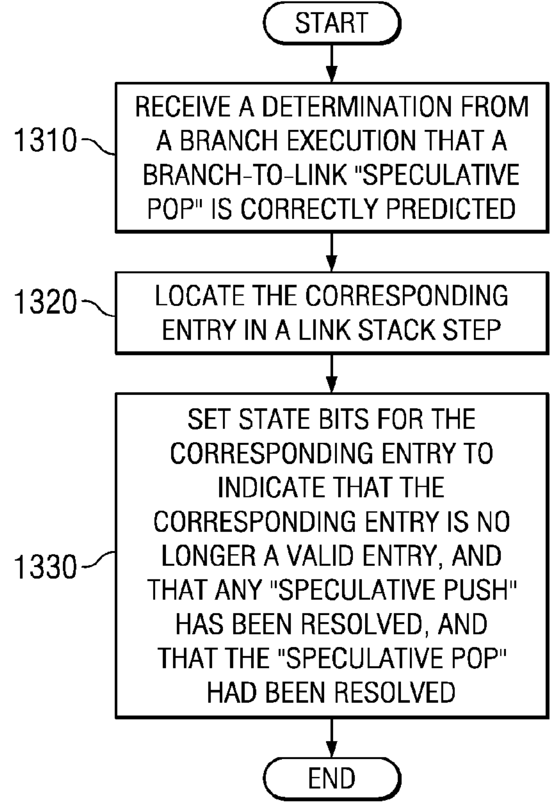
FIG. 13 is a flowchart showing the processing steps of a correctly predicted, branch-to-link "speculative pop" according to an illustrative embodiment.

Referring now to FIG. 13, a flowchart showing the processing steps of a correctly predicted, branch-to-link "speculative pop" is shown according to an illustrative embodiment. Process 1300 is a method of managing a link stack, such as link stack 200 of FIG. 2, within a superscalar processor making speculative predictions, such as processor 10 of FIG. 1.

Process 1300 begins by receiving a determination from a branch execution that a branch-to-link "speculative pop" is correctly predicted (step 1310). Responsive to receiving the determination from a branch execution that the branch-to-link "speculative pop" is correctly predicted, process 1300 locates the corresponding entry in a link stack (step 1320).

Responsive to locating the corresponding entry in a link stack, process 1300 state bits for the corresponding entry to indicate that the corresponding entry is no longer a valid entry, and that any speculative push has been resolved and that any speculative pop has been resolved (step 1330), with the process terminating thereafter. In one illustrative embodiment, the state bits for the corresponding entry are set to "0 0 0" to indicate that the corresponding entry is no longer a valid entry, and that any speculative "push" has been resolved and that any speculative "pop" has been resolved. The corresponding entry is now an "empty" entry.

Figure 14:
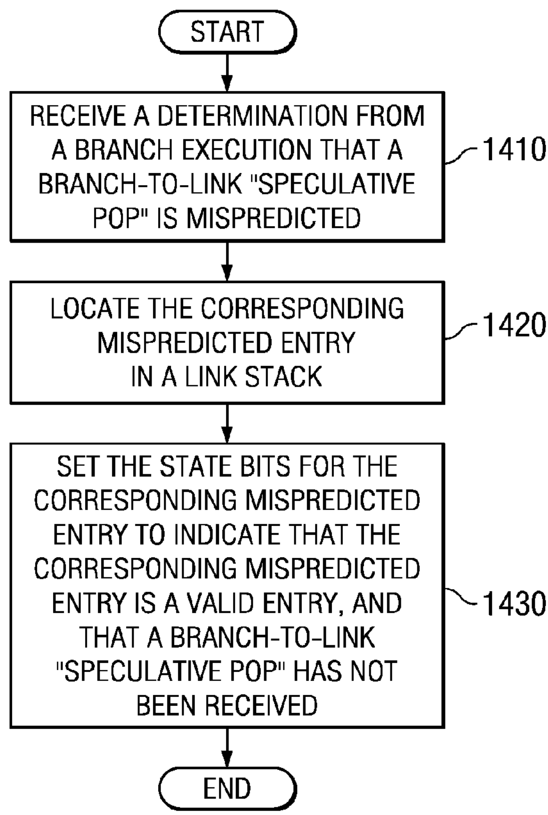
FIG. 14 is a flowchart showing the processing steps of a mispredicted, branch-to-link "speculative pop" according to an illustrative embodiment.

Referring now to FIG. 14, a flowchart showing the processing steps of a mispredicted, branch-to-link "speculative pop" is shown according to an illustrative embodiment. Process 1400 is a method of managing a link stack, such as link stack 200 of FIG. 2, within a superscalar processor making speculative predictions, such as processor 10 of FIG. 1.

Process 1400 begins by receiving a determination from a branch execution that a branch-to-link "speculative pop" is mispredicted (step 1410). Responsive to receiving the determination from a branch execution that the branch-to-link "speculative pop" is mispredicted, process 1400 locates the corresponding mispredicted entry in a link stack (step 1420).

Process 1400 sets state bits for the corresponding mispredicted entry to indicate that the corresponding mispredicted entry is a valid entry, and that a branch-to-link "speculative pop" has not been received (step 1430), with the process terminating thereafter. In one illustrative embodiment, the state bits for the corresponding entry are set to "1 X 0" to indicate that the corresponding mispredicted entry is a valid entry, and that a branch-to-link "speculative pop" has not been received. X herein is the current value of a "push bit."

Figure 15:
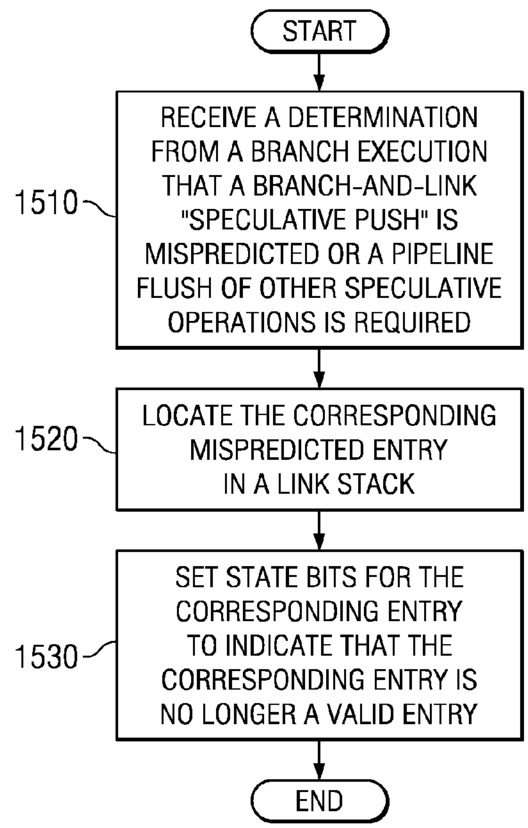
FIG. 15 is a flowchart showing the processing steps of a mispredicted, branch-and-link "speculative push" or a determination of a flush according to an illustrative embodiment.

Referring now to FIG. 15, a flowchart showing the processing steps of a mispredicted, branch-and-link "speculative push" or a determination of a flush is shown according to an illustrative embodiment. Process 1500 is a method of managing a link stack, such as link stack 200 of FIG. 2, within a superscalar processor making speculative predictions, such as processor 10 of FIG. 1.

Process 1500 begins by receiving a determination from a branch tag that a branch-and-link "speculative push" is mispredicted or receiving a determination from a flush tag of a flush (step 1510). Responsive to receiving the determination, process 1500 locates the corresponding mispredicted entry in a link stack (step 1520). Responsive to locating the corresponding entry in a link stack, process 1500 set state bits for the corresponding entry and any entry "above" the corresponding entry in the link stack to indicate that the entries are no longer valid entries (step 1530), with the process terminating thereafter. In one illustrative embodiment, the state bits for the corresponding entry are set to "0 0 0" to indicate that the corresponding entry is no longer a valid entry. The corresponding entry is now an "empty" entry. In a hardware embodiment, any entry to the left of the corresponding entry will also have their state bits reset.

Figure 16:
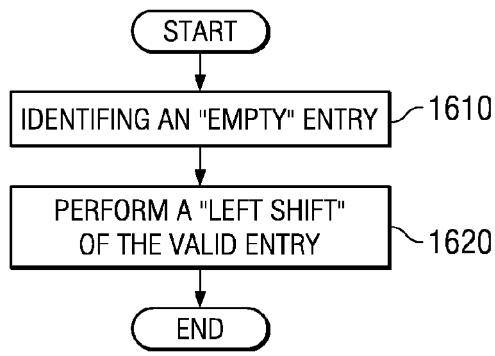
FIG. 16 is a flowchart showing the processing steps of a "left-shift" in response to an "empty entry" according to an illustrative embodiment.

Referring now to FIG. 16, a flowchart showing the processing steps of a "left-shift" in response to an "empty entry" is shown according to an illustrative embodiment. Process 1600 is a method of managing a link stack, such as link stack 200 of FIG. 2, within a superscalar processor making speculative predictions, such as processor 10 of FIG. 1. FIG. 16 is an all hardware implementation, wherein the file indexes are arranged in a left-to-right orientation. The left-most valid file index within the file indexes is designated as the top of the link stack.

Process 1600 begins by identifying an "empty entry" (step 1610) An "empty entry" is a register file index having state bits of "0 0 0" that is "above" a valid entry within the link stack.

Responsive to identifying an "empty entry," process 1600 performs a "left-shift" of the valid entry, with the process terminating thereafter. A "left-shift" is an operation in the link stack pointer control in response to the resolution of a branch-to-link speculative "pop." The register file index for the empty entry is relocated to the bottom of the link stack index of the link stack pointer control. Register file indexes for entries that were entered onto the link stack prior to the empty entry are "shifted-left" in the link stack index of the link stack pointer control.

Thus, the illustrative embodiments described herein provide a computer implemented method, a processor chip, a computer program product, and a data processing system for managing a link stack. The data processing system utilizes speculative pushes onto and pops from the link stack. The link stack comprises a set of entries, and each entry comprises a set of state bits. A speculative push of a first instruction is received onto the data stack, and the first instruction is stored into a first entry of the set of entries. A first bit is set to indicate that the first instruction is a valid instruction. A second bit is set to indicate that the first instruction has been speculatively pushed onto the link stack. The link stack pointer control is updated to indicate that the first entry is a top-of-data stack entry.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a link stack in a data processing system that utilizes speculative pushes onto and pops from the link stack, the link stack comprising a set of entries, wherein each entry comprises a set of state bits, the method comprising:

receiving a speculative push of a first instruction onto the link stack;

storing the first instruction into a first entry of the set of entries of the link stack;

responsive to receiving a speculative push of a first instruction, setting a first bit of a first set of state bits to indicate that the first instruction is a valid instruction;

further responsive to receiving a speculative push of a first instruction, setting a second bit of the first set of state bits to indicate that the first instruction has been speculatively pushed onto the link stack;

further responsive to receiving a speculative push of a first instruction, updating a link stack pointer control to indicate that the first entry is a top-of-data stack entry;

receiving an indication that the speculative push of the first instruction is mispredicted;

responsive to receiving the indication that the speculative push of the first instruction is mispredicted, clearing the first bit of the first set of state bits, clearing the second bit of the first set of state bits, and clearing a third bit of the first set of state bits; and setting the first entry as a bottom-of-data stack entry.

2. The computer implemented method of claim 1, the method further comprising:

receiving a speculative pop of the link stack;

responsive to receiving the pop of the link stack, identifying the top-of-data stack entry;

setting a first bit of a second set of state bits to indicate that a second instruction in the top-of-data stack entry is a valid instruction; and setting a third bit of the second set of state bits, the third bit indicating that a pop of the second instruction has occurred.

3. The computer implemented method of claim 2, the method further comprising:

receiving an indication that the speculative pop of the second instruction is correctly predicted; and responsive to receiving an indication that the speculative pop of the second instruction is correctly predicted, clearing the first bit of a second set of state bits, clearing a second bit of the second set of state bits, and clearing the third bit of the second set of state bits.

4. The computer implemented method of claim 3, the method further comprising:

responsive to clearing the first bit of the second set of state bits, updating the link stack pointer control to indicate that the first entry is the top-of-data stack entry.

5. The computer implemented method of claim 2, the method further comprising:

receiving an indication that the speculative pop is mispredicted;

responsive to receiving the indication that the speculative pop is mispredicted, setting the first bit of a second set of state bits to indicate that a second instruction in the top-of-data stack entry is a valid instruction;

clearing a third bit of the second set of state bits; and updating a link stack pointer control to indicate that the second entry is a top-of-data stack entry.

6. The computer implemented method of claim 1, the method further comprising:

receiving an indication that the speculative push of the first instruction is correctly predicted;

responsive to receiving the indication that the speculative push of the first instruction is correctly predicted, clearing the second bit of the first set of state bits.

7. The computer implemented method of claim 1, the method further comprising:

receiving an indication of a flush of the first instruction; and responsive to receiving the indication of the flush of the first instruction, clearing the first bit of the first set of state bits, clearing the second bit of the first set of state bits, and clearing a third bit of the first set of state bits.

8. The computer implemented method of claim 1, the method further comprising:

receiving a speculative push of a second instruction onto the link stack;

storing the second instruction into a second entry of the set of entries of the link stack;

receiving an indication of a flush of the first instruction;

responsive to receiving the indication of the flush of the first instruction, clearing the first bit of the first set of state bits, clearing the second bit of the first set of state bits, and clearing a third bit of the first set of state bits; and further responsive to receiving the indication of the flush of the first instruction, clearing a first bit of the second set of state bits, clearing a second bit of the second set of state bits, and clearing a third bit of the second set of state bits.

9. A processor chip for managing a link stack in a data processing system that utilizes speculative pushes onto and pops from a link stack, the processor chip comprising:

a processor core;

a link stack, which is utilized by the processor core, comprising a set of entries, wherein each entry comprises a set of state bits; and the processor core executing microcode for managing a link stack, the microcode comprising microcode for receiving a speculative push of a first instruction onto the link stack, microcode for storing the first instruction into a first entry of the set of entries of the link stack, responsive to receiving a speculative push of a first instruction, microcode for setting a first bit of a first set of state bits to indicate that the first instruction is a valid instruction, further responsive to receiving a speculative push of a first instruction, microcode for setting a second bit of the first set of state bits to indicate that the first instruction has been speculatively pushed onto the link stack, further responsive to receiving a speculative push of a first instruction, microcode for updating a link stack pointer control to indicate that the first entry is a top-of-data stack entry; microcode for receiving a speculative pop of the link stack, responsive to receiving the pop of the link stack, microcode for identifying the top-of-data stack entry, microcode for setting a first bit of a second set of state bits to indicate that a second instruction in the top-of-data stack entry is a valid instruction, and microcode for setting a third bit of the second set of state bits, the third bit indicating that a pop of the second instruction has occurred; microcode for receiving an indication that the speculative pop of the second instruction is correctly predicted, responsive to receiving an indication that the speculative pop of the second instruction is correctly predicted, microcode for clearing the first bit of a second set of state bits, microcode for clearing a second bit of the second set of state bits, and microcode for clearing the third bit of the second set of state bits; and microcode for removing the second instruction from the second entry.

10. The processor chip for managing a link stack of claim 9, the microcode for managing a link stack further comprising:

microcode for receiving an indication that the speculative push of the first instruction is correctly predicted, and responsive to receiving the indication that the speculative push of the first instruction is correctly predicted, microcode for clearing the second bit of the first set of state bits.

11. The processor chip for managing a link stack of claim 10, the microcode for managing a link stack further comprising:

microcode for updating a link stack pointer control to indicate that the first entry is a top-of-data stack entry.

12. The processor chip for managing the link stack of claim 9, the microcode for managing the link stack further comprising:

microcode for receiving an indication that the speculative push of the first instruction is mispredicted, responsive to receiving the indication that the speculative push of the first instruction is mispredicted, microcode for clearing the first bit of the first set of state bits, microcode for clearing the second bit of the first set of state bits, microcode for clearing a third bit of the first set of state bits.

13. The processor chip for managing a link stack of claim 9, the microcode for managing the link stack further comprising:

microcode for receiving an indication that the speculative pop is mispredicted, responsive to receiving the indication that the speculative pop is mispredicted, microcode for setting the first bit of a second set of state bits to indicate that a second instruction in the top-of-data stack entry is a valid instruction, microcode for clearing a third bit of the second set of state bits; and microcode for updating a link stack pointer control to indicate that the first entry is the top-of-data stack entry.

14. A computer program product stored in a computer readable medium for managing a link stack utilizing speculative pushes onto and pops from the link stack, the link stack comprising a set of entries, wherein each entry comprises a set of state bits, the computer program product comprising:

computer usable program code for receiving a speculative push of a first instruction onto the link stack;

computer usable program code for storing the first instruction into a first entry of the set of entries of the link stack;

computer usable program code, responsive to receiving a speculative push of a first instruction, for setting a first bit of a first set of state bits to indicate that the first instruction is a valid instruction;

computer usable program code, further responsive to receiving a speculative push of a first instruction, for setting a second bit of the first set of state bits to indicate that the first instruction has been speculatively pushed onto the link stack;

computer usable program code, further responsive to receiving a speculative push of a first instruction, for updating a link stack pointer control to indicate that the first entry is a top-of-data stack entry;

computer usable program code for receiving an indication that the speculative push of the first instruction is correctly predicted;

computer usable program code, responsive to receiving the indication that the speculative push of the first instruction is correctly predicted, for clearing the second bit of the first set of state bits;

computer usable program code for receiving an indication that the speculative pop of the second instruction is correctly predicted; and computer usable program code, responsive to receiving an indication that the speculative pop of the second instruction is correctly predicted, for clearing the first bit of a second set of state bits, clearing a second bit of the second set of state bits, and clearing the third bit of the second set of state bits.

15. The computer program product of claim 14 further comprising:

computer usable program code for receiving a speculative pop of the link stack;

computer usable program code, responsive to receiving the pop of the link stack, for identifying the top-of-data stack entry;

computer usable program code for setting a first bit of a second set of state bits to indicate that a second instruction in the top-of-data stack entry is a valid instruction; and computer usable program code for setting a third bit of the second set of state bits, the third bit indicating that a pop of the second instruction has occurred.

* * * * *